United States Patent

Nam et al.

[11] Patent Number: 5,844,945
[45] Date of Patent: Dec. 1, 1998

[54] VITERBI DECODER FOR A HIGH DEFINITION TELEVISION

[75] Inventors: Ho Jun Nam, Seoul; Heung Sik Kwak, Kyungki-do, both of Rep. of Korea

[73] Assignee: Goldstar Co., Ltd., Rep. of Korea

[21] Appl. No.: 371,018

[22] Filed: Jan. 11, 1995

[30] Foreign Application Priority Data

Apr. 12, 1994 [KR] Rep. of Korea ................ 7627/1994
Apr. 12, 1994 [KR] Rep. of Korea ................ 7635/1994

[51] Int. Cl.⁶ ..................................... H03D 1/06
[52] U.S. Cl. ........................ 375/341; 375/262; 371/43
[58] Field of Search ........................ 375/262, 265, 375/270, 277, 321, 341; 348/426; 371/43, 30

[56] References Cited

U.S. PATENT DOCUMENTS

| | | |
|---|---|---|
| 4,597,090 | 6/1986 | Forney, Jr. . |
| 4,713,817 | 12/1987 | Wei . |
| 4,713,829 | 12/1987 | Eyuboglu . |
| 4,755,998 | 7/1988 | Gallager . |
| 4,777,636 | 10/1988 | Yamashita et al. ............... 371/43 |
| 4,894,844 | 1/1990 | Forney, Jr. . |
| 5,150,381 | 9/1992 | Forney, Jr. et al. . |
| 5,159,610 | 10/1992 | Eyuboglu et al. . |
| 5,214,672 | 5/1993 | Eyuboglu et al. . |
| 5,297,170 | 3/1994 | Eyuboglu et al. . |
| 5,410,555 | 4/1995 | Itakura et al. ............... 371/43 |
| 5,416,787 | 5/1995 | Kodama et al. ............... 371/43 |
| 5,418,795 | 5/1995 | Itakura et al. ............... 371/30 |
| 5,440,588 | 8/1995 | Murakami ............... 375/341 |
| 5,508,752 | 4/1996 | Kim et al. ............... 348/608 |

Primary Examiner—Wellington Chin
Assistant Examiner—Jean B. Corrielus
Attorney, Agent, or Firm—Fish & Richardson P.C.

[57] ABSTRACT

A Viterbi decoder for receiving and decoding a signal transmitted through a transmission channel in a vestigial side band (VSB) transmission system, in a high definition television (HDTV), which operates at the same speed as a symbol rate, can simply accomplish a hardware implementation using simplified memory system and a single decoder in order to restore an encoded signal, compared to the conventional art in which 12 decoders are used in restoring the encoded signal. Also, since the memory configuration thereof is regular, when it is intended to extend the observation sections, the memory structure can be extended easily. Moreover, the present invention can be adopted by extending easily to 3-bit 8 state or above as well as to 2-bit 4-state by means of a general Viterbi decoding algorithm.

16 Claims, 10 Drawing Sheets

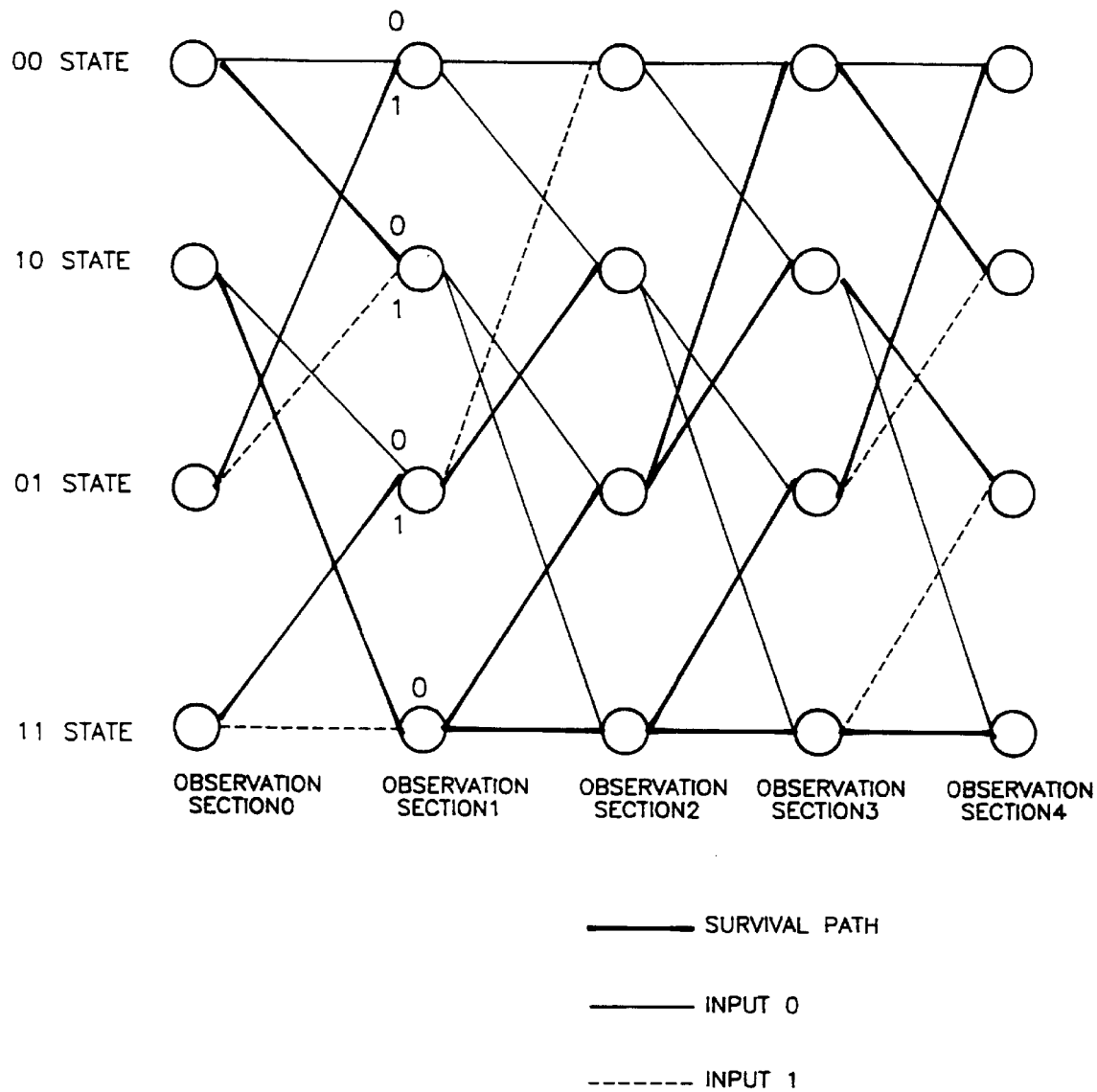

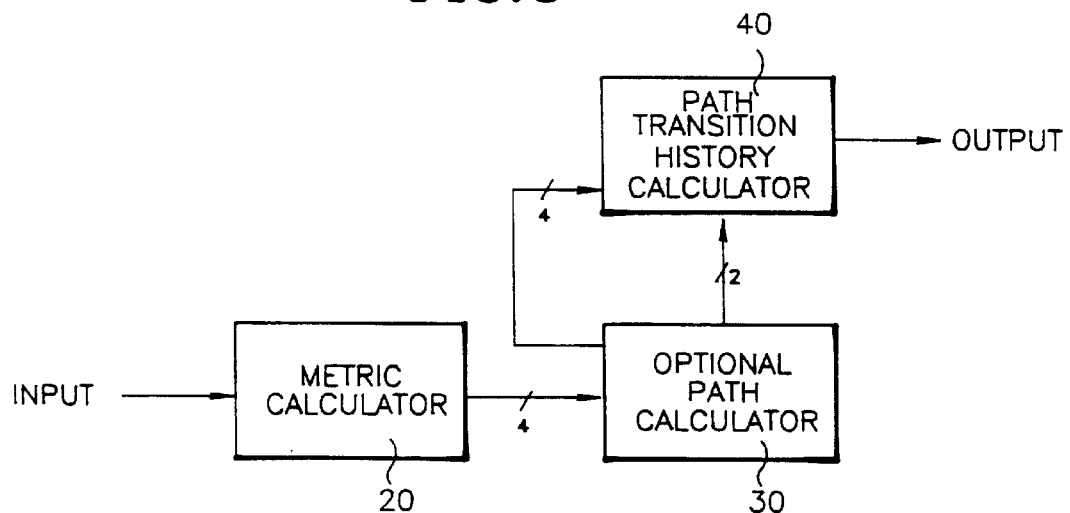
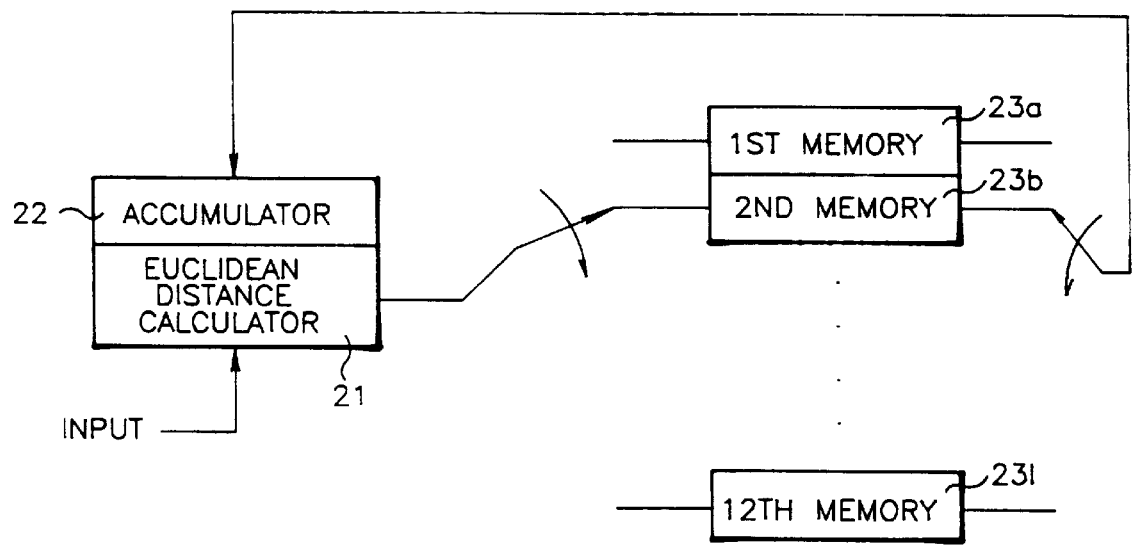

FIG.10
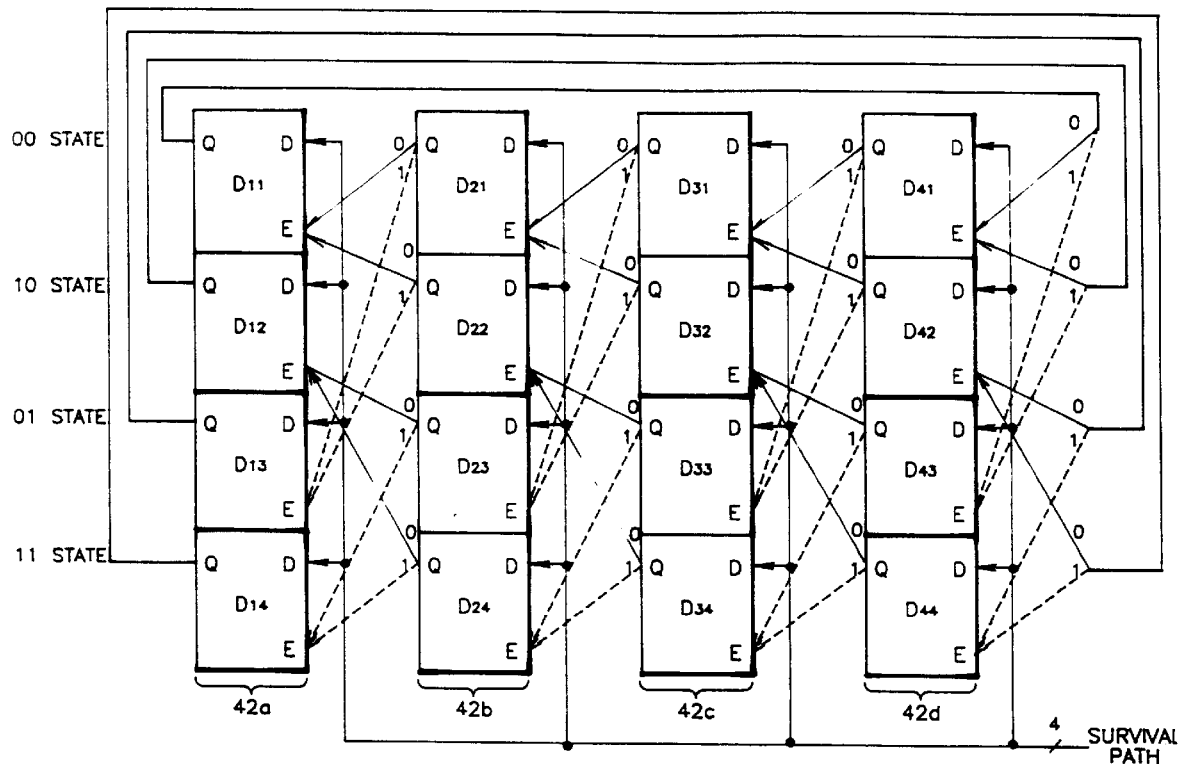
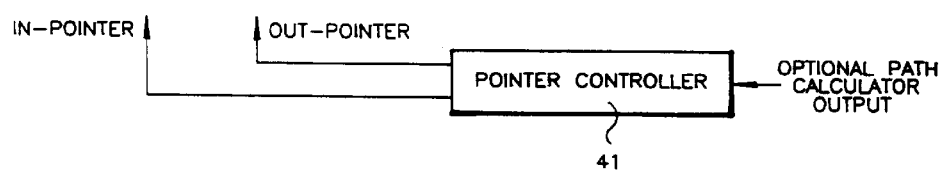
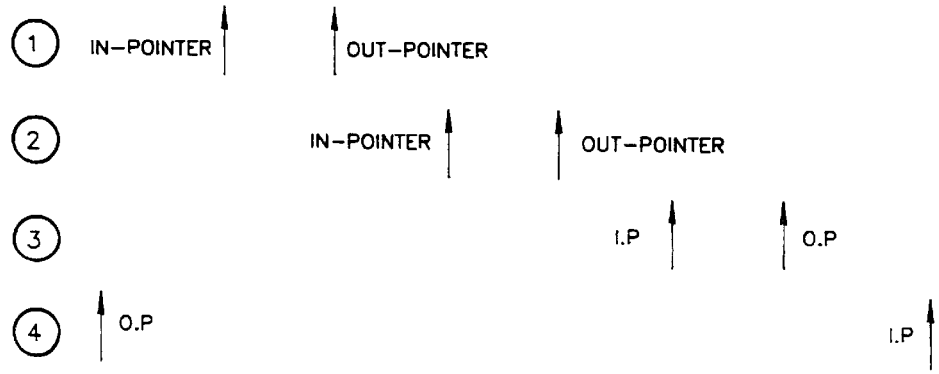

VITERBI DECODER FOR A HIGH DEFINITION TELEVISION

BACKGROUND OF THE INVENTION

The present invention relates to a Viterbi decoder for receiving and decoding a signal transmitted through a transmission channel in a vestigial side band (VSB) transmission system, in a high definition television (HDTV), and more particularly, to a Viterbi decoder for the HDTV which operates at the same speed as a symbol rate.

The Grand Alliance (GA) of the U.S.A. has recently decided an eight VSB method as a HDTV transmission method. By this method, a Reed-Solomon (R-S) encoder 1 and a Trellis encoder 2 shown in FIG. 1, are adopted for a channel coding.

That is to say, as shown in FIG. 1, a channel coding system of a transmit side is constituted by a R-S encoder 1 for R-S encoding input data and a Trellis encoder 2 for Trellis encoding the data output from the R-S encoder 1 and a channel coding system of a receive side is constituted by a Trellis decoder 3 for Trellis decoding the transmitted data and a R-S decoder 4 for R-S decoding the data output from the Trellis decoder 3, thereby performing coding and decoding operations, respectively.

A Trellis code of two-to-three ratio is used as a terrestrial VSB transmission mode.

That is to say, if a two bit signal is input, one bit is coded to be two bits using ½ convolutional code in the input signal and the remaining one bit is not coded.

Therefore, the signal waveform using Trellis code has eight levels of three bits. The signal transmitted with eight levels is called an 8 VSB.

In the case of 8 VSB method, Trellis encoder 2 is constituted by a convolutional encoder 5 and a Trellis coded modulation (TCM) mapper 6, as shown in FIG. 2. Of the two bit input signal, one bit is output to TCM mapper 6 in an uncoded state. The remaining one bit is made into two bits through the convolutional encoder 5 to then output to TCM mapper 6 and is TCM mapped in the TCM mapper 6 to then be output.

The convolutional encoder 5 having memories 7 and 8 connected serially for delaying input signals in a unit of 12 symbols, respectively, an adder 9 for adding an input signal to the output signal of the memory 7, an adder 11 for adding an input signal to the output signal of the memory 8, and an adder 10 for adding the output signal of the adder 9 with the output signal of the memory 8 to then output the added signal to the TCM mapper 6, delays the remaining one bit in the memories 7 and 8 by 12 symbols, respectively, adds in the adders 9, 10 and 11 to make into two bits and then outputs to TCM mapper 6.

The Trellis encoder 2 performs a transmission using 12 Trellis encoder connected in parallel, as shown in FIG. 3.

That is to say, as shown in FIG. 3, the convolution encoder 5 is constituted by 12 encoders 5-1 to 5-12. A demultiplexer 12 and a multiplexer 13 are used for multiplexing the input and output of the encoder, respectively.

Since the input signal is stored in memory in the unit of 12 symbols as described above, among the input symbols, 1st, 13th, 25th, ... symbols are applied to first encoder 5-1, 2nd, 14th, 26th, ... symbols are applied to second encoder 5-2, 3rd, 15th, 27th, ... symbols are applied to third encoder 5-3, ... 11th, 23rd, 35th, ... symbols are applied to eleventh encoder 5-11, and 12th, 24th, 36th, ... symbols are applied to twelfth encoder 5-12, respectively.

In order to restore in the reception portion the input data encoded in transmission portion using the convolutional encoder shown in FIG. 3, Trellis decoder shown in FIG. 4 is used.

The Trellis decoder restores the input data encoded by the Trellis encoder and outputs the restored input data, as shown in FIG. 4, which performs the reverse operation to that of the Trellis encoder shown in FIG. 3. The Trellis decoder also requires 12 convolutional decoder 15-1 to 15-12, a demultiplexer 14 and a multiplexer 16, like the Trellis encoder.

In order to restore the data convolutionally encoded as shown in FIG. 3, a Viterbi algorithm is adopted.

Since the data currently convolutional encoded in the convolutional encoder depends on the previous convolutional encoded data, the data output after being convolutional encoded through the convolutional encoder are not all output values of the convolutional encoder but outputs only waveforms limited in accordance with previous input values, i.e., previous states. Therefore, the Viterbi decoder observes the received waveforms applied from the reception portion and estimates the most probable input value.

That is to say, Viterbi algorithm traces an optimal input value such that, if four states of 00, 10, 01 and 11 are generated with respect to two bit input signal and two paths intersect in each state, since the optimal paths are the same from the next stages, only one survival path of a state is left and the remaining one path is removed.

Therefore, Viterbi algorithm consists of steps of calculating a survival path from two paths intersecting in the respective states for each observation section, and storing the transition history of the survival path in memory for each state.

In order to trace an optimal survival path, the waveform of indefinite section should be observed. However, in order to simplify the hardware configuration, a constant section is observed and an optimal path in the observation section is selected to then be output the input value at that time.

Referring to FIG. 5 showing Trellis diagram, 00, 10, 01 and 11 states are generated in each section with respect to two bit input signal and two paths intersect in each state.

That is to say, the paths of the 00 and 01 states of an observation section 0 intersect in the 00 state of an observation section 1, the paths of the 00 and 01 states intersect in the 10 state, the paths of the 10 and 11 states intersect in the 01 state, and the paths of the 10 and 11 states intersect in the 11 state.

In this manner, the relationship where two paths intersecting in each state is constant for all sections.

At this time, two paths intersecting in each state have data values of 0 and 1.

Here, it is assumed that the path applied upward is 0 and the path applied downward is 1, in each state.

A survival path is determined such that, of the two paths intersecting in each state, one path is selected and the other path is removed. As shown in FIG. 5, the paths of the 00 state of input 0 and 01 state of input 1 of an observation section 0 intersect in the 00 state of an observation section 1. Of these, the path of the 01 state of input 1 applied downward becomes the survival path.

The paths of the 10 state of input 0 and 11 state of input 1 of an observation section 0 intersect in the 01 state of an observation section 1. Of these, the path of the 11 state of input 1 applied downward becomes the survival path.

The paths of the 00 state of input 0 and 01 state of input 1 of an observation section 0 intersect in the 00 state of an observation section 1. Of these, the path of the 11 state of input 0 applied upward becomes the survival path.

In this manner, the survival path is obtained for each state of the respective states in the observation section and an optimal path of the observation section is selected to the output the input value at that time.

That is to say, in the Viterbi algorithm, of the two transition paths input for the respective states, the path having smaller Euclidean distance, which has a higher probability of being generated, is left and the other path is removed.

The aforementioned processes are repeated in the next stages to then leave only a survival path so that bits prior to being coded in the original transmit side can be identified.

That is to say, the basic concept of the Viterbi algorithm is that an actually received signal is compared with all possibly received signals on the Trellis diagram and the results thereof are collectively observed for a constant time period, thereby selecting the most probable signal of being received. By doing so, the received signal can restore the originally transmitted data exactly even if the original data is deteriorated by noise.

Although the observation section is limited within a constant range, it is quite difficult to select an output value of decoded bits after collecting and comparatively analyzing the results for the observation sections within the constant range.

Also, since a HDTV receiver requires a data transmission rate of 10.76M symbol per second, the method by which the Viterbi decoding algorithm has been implemented until now requires a very complex comparison and determination logic and memory utilizing a separate clock ten to 80 times faster than the symbol rate (per second), which is very difficult to accomplish. Moreover, since the HDTV receiver requires 12 Viterbi decoders, the hardware is very hard to be implemented.

Also, the existing Viterbi decoders have different coding specification with that of a decoder for a HDTV. In addition, since their operational speed thereof ranges only from hundreds Kbps to several Mbps, they are not suitable for a HDTV which requires a speed of 10M symbol per second.

SUMMARY OF THE INVENTION

To solve the above problems of the prior art, it is an object of the present invention to provide a Viterbi decoder for a HDTV which can accomplish a hardware implementation simply.

To accomplish the above object, the Viterbi decoder according to the present invention comprises:

metric calculating means for obtaining the difference value between input signal and branch value and adding the obtained value with the accumulated previous metric value;

optimal path calculating means for outputting information on a survival path for each stage and an optimal survival path within an observation section using the metric value output from the metric calculating means; and path transition history calculating means for determining the value to be output within the observation section from the path information obtained by the optimal path calculating means.

BRIEF DESCRIPTION OF THE DRAWINGS

The above objects and advantages of the present invention will become more apparent by describing in detail a preferred embodiment thereof with reference to the attached drawings in which:

FIG. 5 is a Trellis diagram of the Trellis decoder shown in FIG. 1;

FIG. 6 is a block diagram of a Viterbi decoder for a HDTV according to the present invention;

FIG. 7 is a detailed circuit diagram of the metric calculator shown in FIG. 6;

FIG. 10 is a detailed circuit diagram of the path transition history calculator shown in FIG. 6 according to an embodiment of the present invention;

DETAILED DESCRIPTION OF THE INVENTION

Figure 1:
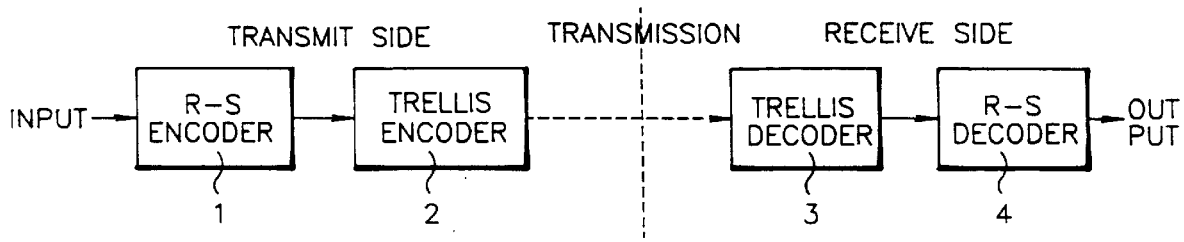
FIG. 1 is a block diagram of a channel coding system for a general HDTV.

The Viterbi decoder for a HDTV according to the present invention is constituted by a metric calculator 20, an optimal path calculator 30 and a path transition history calculator 40, as shown in FIG. 6.

If a signal is input to the Viterbi decoder, the metric calculator 20 obtains the difference value between the input signal and a branch value for each stage shown in the Trellis diagram of FIG. 5 and adds the obtained value with the accumulated previous metric values.

The optimal path calculator 30 leaves one path as it is, removes the other path, with respect to two paths input for each stage, using the metric value previously calculated, stored and output from the metric calculator 20 and then outputs information on survival paths and an optimal survival path within a observation section.

The path transition history calculator 40 determines the value to be output within the observation section from the optimal survival path information determined in the optimal path calculator 30. That is to say, the path transition history calculator 40 stores the optimal survival path information determined in the optimal path calculator 30 for a given observation section, compares and determines the same and finally obtains an output value of decoded bits, i.e., the final path transition history tracing result, by a reverse trace whereby the trace is performed from the last stage to the first stage of the observation section.

Here, according to an embodiment of the present invention, in- and out-pointers are set from path information output from the optimal path calculator 30 to then determine a value to be output within the observation section, 12 memory blocks each performing the same function, are constituted in parallel according to the multiplexing function to then decode perfectly the data isolated by the interval of 12 memory units by the Trellis encoder of the transmit side.

Here, the in-pointer represents a signal to load to the corresponding memory block and a point indicating the position of the memory block corresponding to the state where the optimal path input from the optimal path calculator 30 begins. The out-pointer is a point indicating the position of the memory block outputting the tracing result of the final path transition history.

The metric calculator 20 includes an Euclidean distance calculator 21 for calculating the difference between input signal and branch value, an accumulator 22 for accumulating metric values and a plurality of memories for adding the output of the Euclidean distance calculator 21 with the previous metric value and storing the added value therein and outputting to the accumulator 22 and the optimal path calculator 30. Here, the metric calculator 20 is provided for each state.

Figure 8:
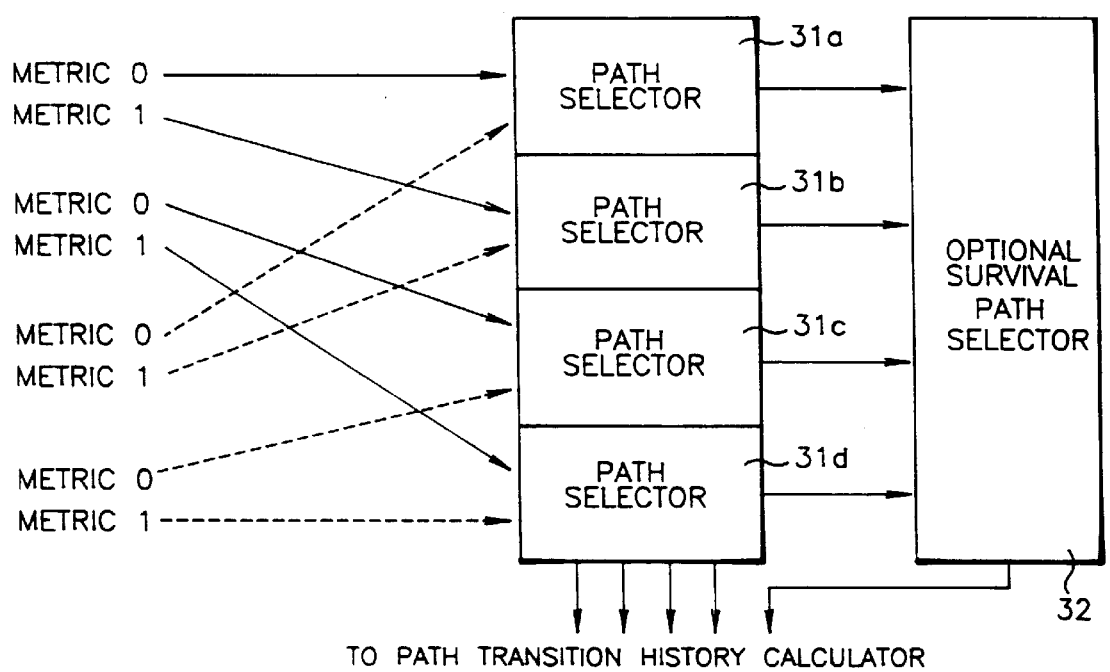
FIG. 8 is a detailed circuit diagram of the optimal path calculator shown in FIG. 6.

The optimal path calculator 30 includes a plurality of path selectors 31a, 31b, 31c and 31d for comparing two input metric values output from the metric calculator 20 and selecting the path having a smaller metric value as a survival path, and an optimal survival path selector 32 for comparing the outputs of the path selectors 31a, 31b, 31c and 31d and selecting the path having the smallest metric value, as shown in FIG. 8. Here, a plurality of path selectors 31a, 31b, 31c and 31d are provided for each state.

The path transition history calculator 40 according to an embodiment of the present invention includes a pointer controller 41 for setting in- and out-pointers in accordance with information on the optimal survival path output from the optimal path calculator 30, and a plurality of memory blocks 42a, 42b, 42c and 42d for calculating the path transition history in accordance with the information on the survival path enabled by the in-pointer output from the pointer controller 41 and output from the optimal path calculator 30 and outputting the result of the final path transition history in accordance with the out-pointer.

Here, the number of the plurality of memory blocks 42a, 42b, 42c and 42d are determined by the set observation sections and there are composed of a first memory block 42a for storing the information on the survival path of an observation section 1 among the information on the survival path output from the optimal path calculator 30, a second memory block 42b for storing the information on the survival path of an observation section 2, a third memory block 42c for storing the information on the survival path of an observation section 3, and a fourth memory block 42d for storing the information on the survival path of an observation section 4.

Here, the respective memory blocks 42a, 42b, 42c and 42d include a plurality of latches D11 to D44 corresponding to the respective states.

The information on the survival path of the respective observation sections output from the optimal path calculator 30 is applied to each input port D of the latches D11 to D44 constituting the memory blocks 42a, 42b, 42c and 42d, respectively. The latches D11 to D41 for storing the information on the survival path of 00 state of each observation section are enabled by the output signal Q of the latches D21 to D11 for storing the information on the survival path of 00 state of the next observation section or the output signal Q of the latches D22 to D12 for storing the information on the survival path of 10 state of the next observation section. The latches D12 to D42 for storing the information on the survival path of 10 state of each observation section are enabled by the output signal Q of the latches D23 to D13 for storing the information on the survival path of 01 state of the next observation section or the output signal Q of the latches D24 to D14 for storing the information on the survival path of 11 state of the next observation section. The latches D13 to D43 for storing the information on the survival path of 01 state of each observation section are enabled by the output signal Q of the latches D21 to D11 for storing the information on the survival path of 00 state of the next observation section or the output signal Q of the latches D22 to D12 for storing the information on the survival path of 10 state of the next observation section. The latches D14 to D44 for storing the information on the survival path of 11 state of each observation section are enabled by the output signal Q of the latches D23 to D13 for storing the information on the survival path of 01 state of the next observation section or the output signal Q of the latches D24 to D14 for storing the information on the survival path of 11 state of the next observation section.

Figure 2:
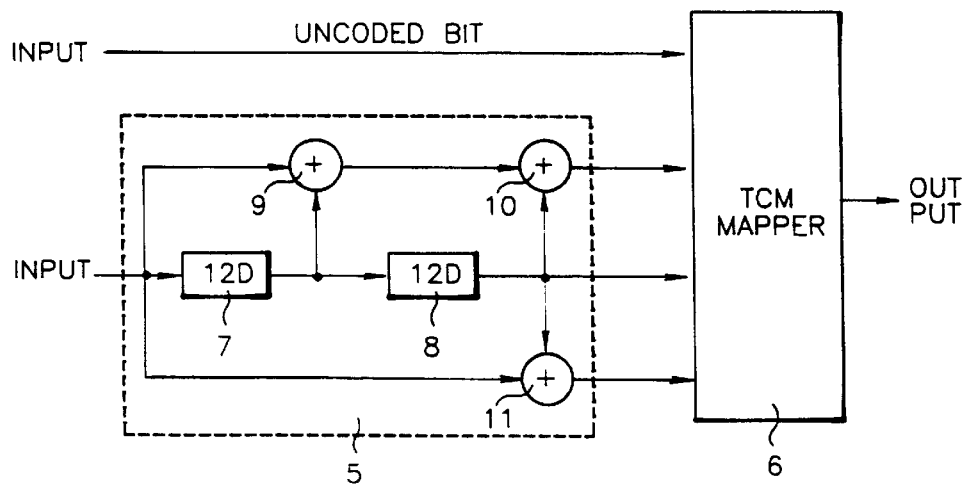
FIG. 2 is a circuit diagram of the Trellis encoder shown in FIG. 1.
Figure 3:
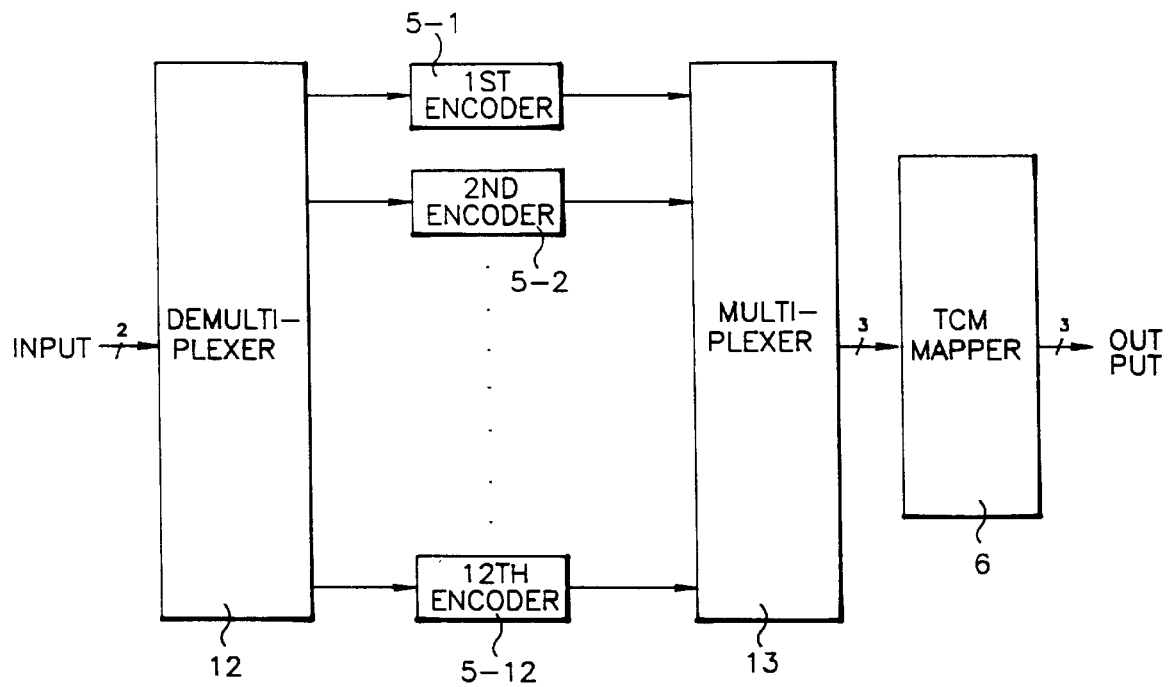
FIG. 3 shows the concept of the Trellis encoder shown in FIG. 2.

In order to explain the operation of the Viterbi decoder for a HDTV according to the present invention having the aforementioned configuration, it is assumed that the Trellis encoder having one uncoded bit and two memories, which is a GA specification for the HDTV, is the same as that shown in FIG. 2. Then, the Trellis diagram according to a given encoder becomes the structure having four states as shown in FIG. 5.

Therefore, the Viterbi decoder for a HDTV according to the present invention has each metric calculator 20 for each state and the Euclidean distance calculator 21 of the metric calculator 20 obtains the difference between input signal and a branch value which is known on the Trellis decoder diagram, which is the Euclidean distance value. The Euclidean distance calculator 21 adds the obtained Euclidean distance value with the previous value stored in the memories 23a to 23d and outputs the added value to the optimal path calculator 30. Also, the Euclidean distance calculator 21 feeds back the obtained value to the accumulator 22 to then be added with the accumulated previous metric value.

Figure 4:
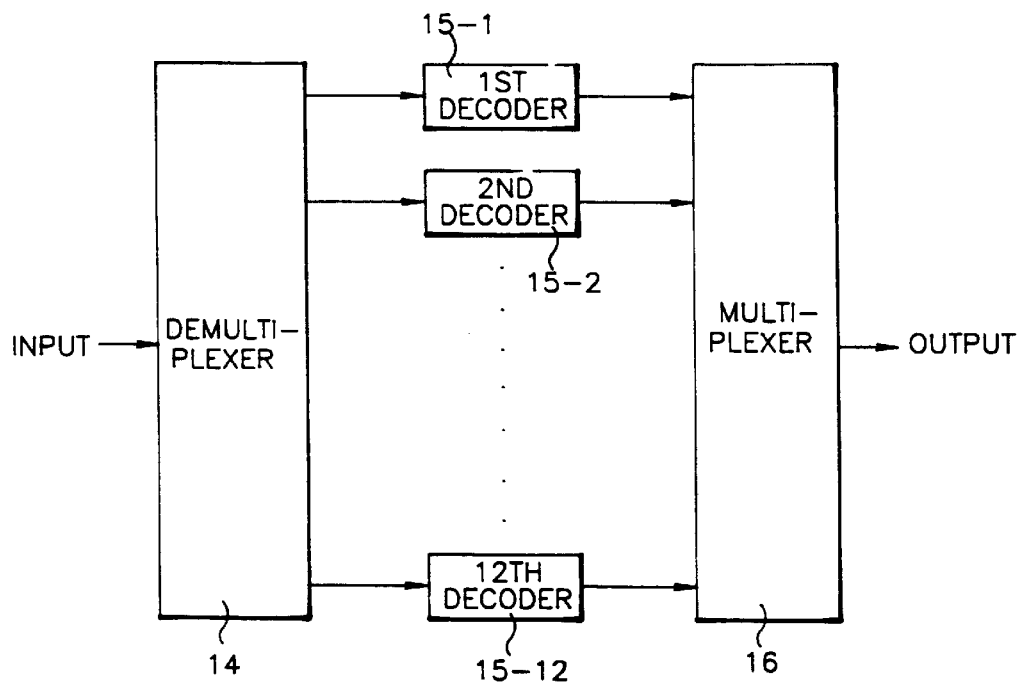
FIG. 4 shows the concept of the Trellis decoder shown in FIG. 1.

Also, the metric calculator 20 performs the same function and has the same configuration as that of the Trellis decoder shown in FIG. 4. Thus, as shown in FIG. 7, there is provided only one accumulator 22. 12 memories 13a to 13l for storing for 12 periods are provided.

Meanwhile, the optimal path calculator 30 transmits each two metric values input from the metric calculator 20 for each state to the path selectors 31a to 31d for each state, compares the two input metric values and selects the path having smaller metric value, i.e., the path having more generation probability, as a survival path.

The thus selected path is transmitted to the path transition history calculator 40, the metric values of each state are compared in the optimal path selector 32 and the path having the smallest metric value is selected to then be transmitted to the path transition history calculator 40. That is to say, the information on the survival paths for each state and the optimal path is output to the path transition history calculator 40.

Before describing an embodiment of the path transition history calculator 40, the operation of the path transition history calculator 40 will be described with reference to FIG. 9.

Figure 9:
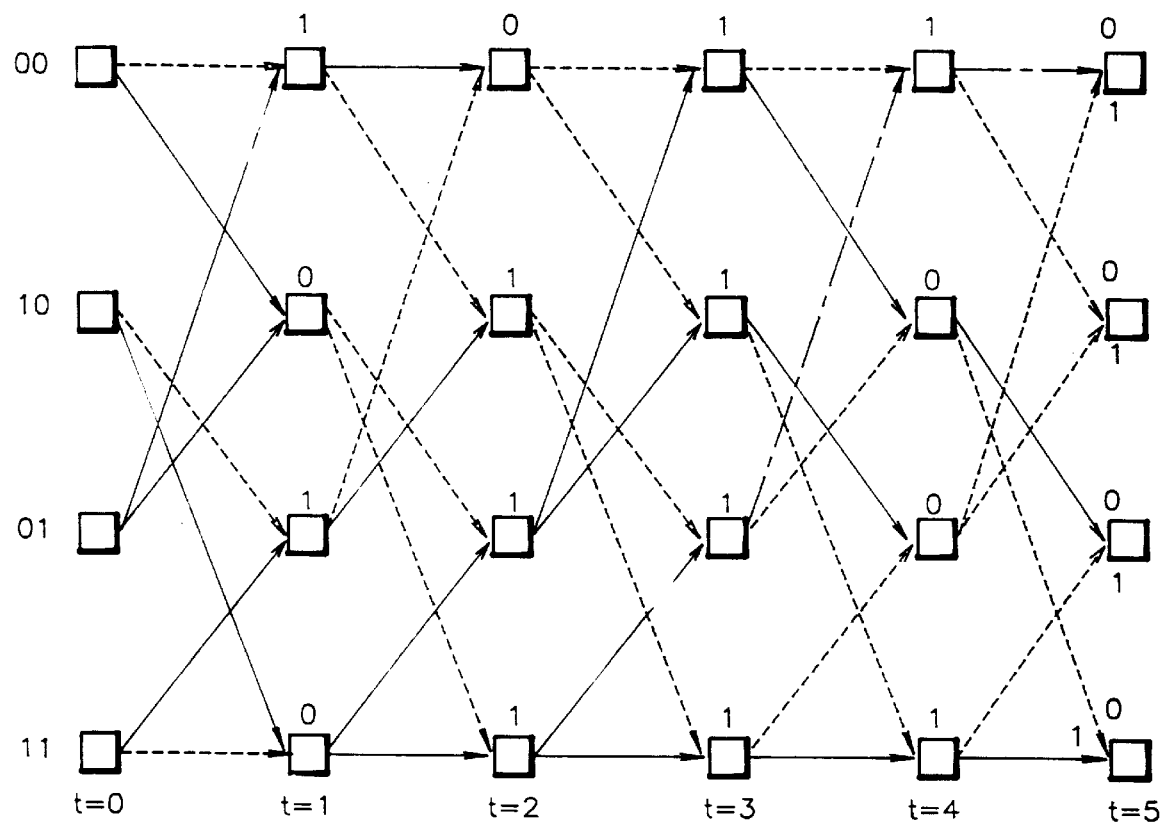
FIG. 9 is a diagram showing the survival path on the diagram for a Trellis decoder.

In FIG. 9, the paths marked as solid lines are survival paths each selected for each state at a given stage. Among these, the path marked as dotted lines are optimal survival paths selected at stages when t=4 and t=5. If these portions are known, the output value at stages when t=0 and t=1, i.e., the previous data prior to being coded in the transmit side, can be identified exactly.

An embodiment of the path transition history calculator 40 will now be described with reference to FIG. 10.

First, to explain this, it is assumed that the observation sections are set as four. Then, the path transition history calculator 40 includes four memory blocks 42a to 42d combined by each four latches D11 to D44, as described above. The characteristic of this configuration allows the information on the configuration of the Trellis diagram to be loaded on a hard wire such that the Trellis diagram of the decoder is devised in a hardware utilizing the fact that the Trellis encoder is structure of four states.

By doing so, the amount of the information to be stored for decoding can be reduced to a half, the complexity of the hardware is reduced and the operational speed of this portion becomes the same as data transmission rate.

The overall contents of the respective memory blocks 42a to 42d are not necessary to be stored newly each time but only a given portion is newly stored. For the remaining portion, the stored information is just output or is not output. Thus, the transition history on the Trellis diagram can be traced.

Meanwhile, the in-pointer represents a signal to load to the respective memory blocks 42a to 42d and a point where the state where the optimal path input from the optimal path calculator 30 begins is input to the memory blocks 42a to 42d.

The out-pointer is a point indicating the position of the memory blocks 42a to 42d for outputting the tracing result of the final path transition history. The result can be obtained from the position of the state from which the output is generated and the content stored in each memory using a look-up table (not shown) for outputting the input values of the Trellis encoder depending on the variation of the state values of each stage, which produces the outputs of the overall Trellis diagram.

That is to say, it is not necessary to store and move the content of the overall memory blocks 42a to 42d. A desired output can be obtained only by shifting the in- and out-pointers. These two pointers rotates in four cycles of the observation sections numbered as ①, ②, ③ and ④ as shown in FIG. 10.

The operation of the path transition history calculator 40 according to an embodiment of the present invention will now be described with reference to FIGS. 11 and 12.

Figure 11:
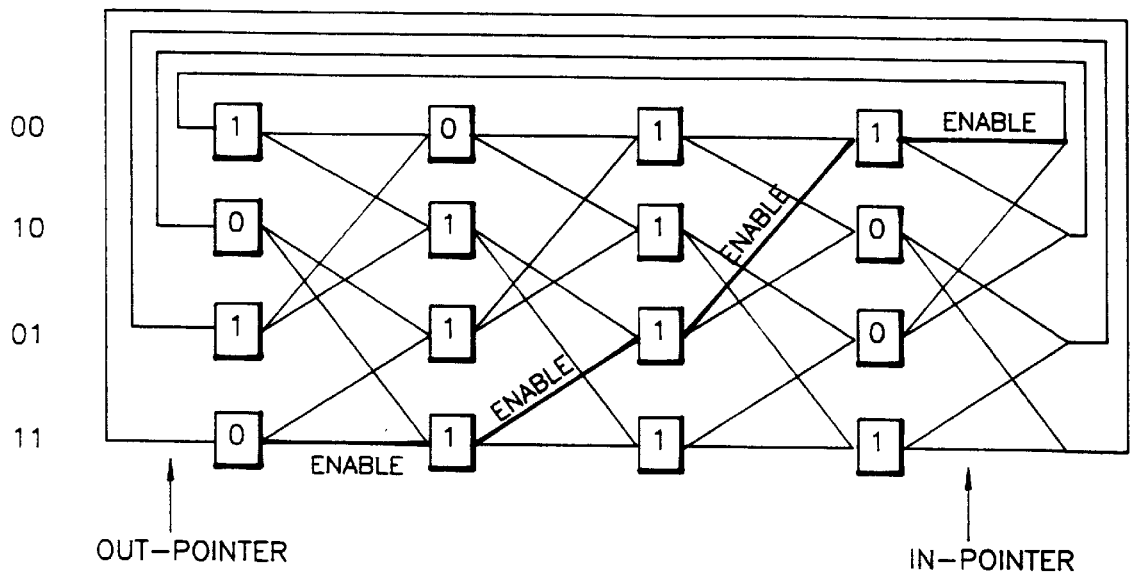
FIGS. 11 and 12 are diagrams for explaining the operation of FIG. 10.

First, in FIG. 11, at the stage where t=4, since the in-pointer begins when the optimal path is in 00 state (refer to FIG. 9), an enable signal is input only to the uppermost latch D41 of the memory block 42d, the latch corresponding to 00 state.

Then, an output value "0" is generated at the position indicated by the out-pointer. Output bits are selected from the look-up table using the information saying that 11 state is a path from 10 state since "0" is output.

Figure 12:
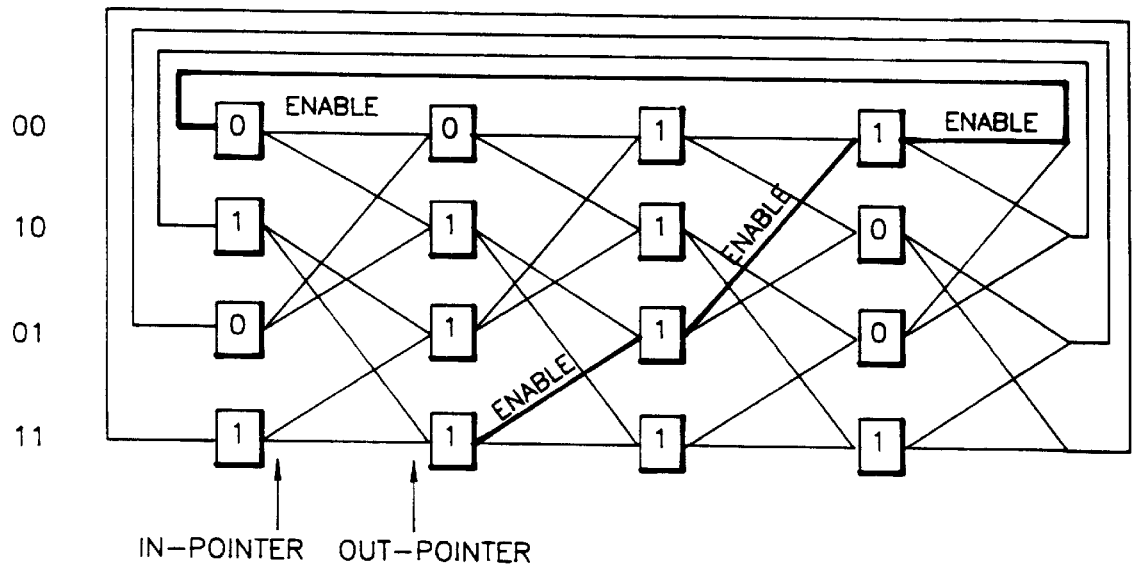

Also, in FIG. 12, at the stage where t=1, since the in-pointer begins when the optimal path is in 00 state (refer to FIG. 9), an enable signal is input only to the uppermost latch D11 of the memory block 42a, the latch corresponding to 00 state.

Then, an output value "1" is generated at the position indicated by the out-pointer. Output bits are selected from the look-up table using the information saying that 11 state is a path from 11 state since "1" is output.

Figure 13:
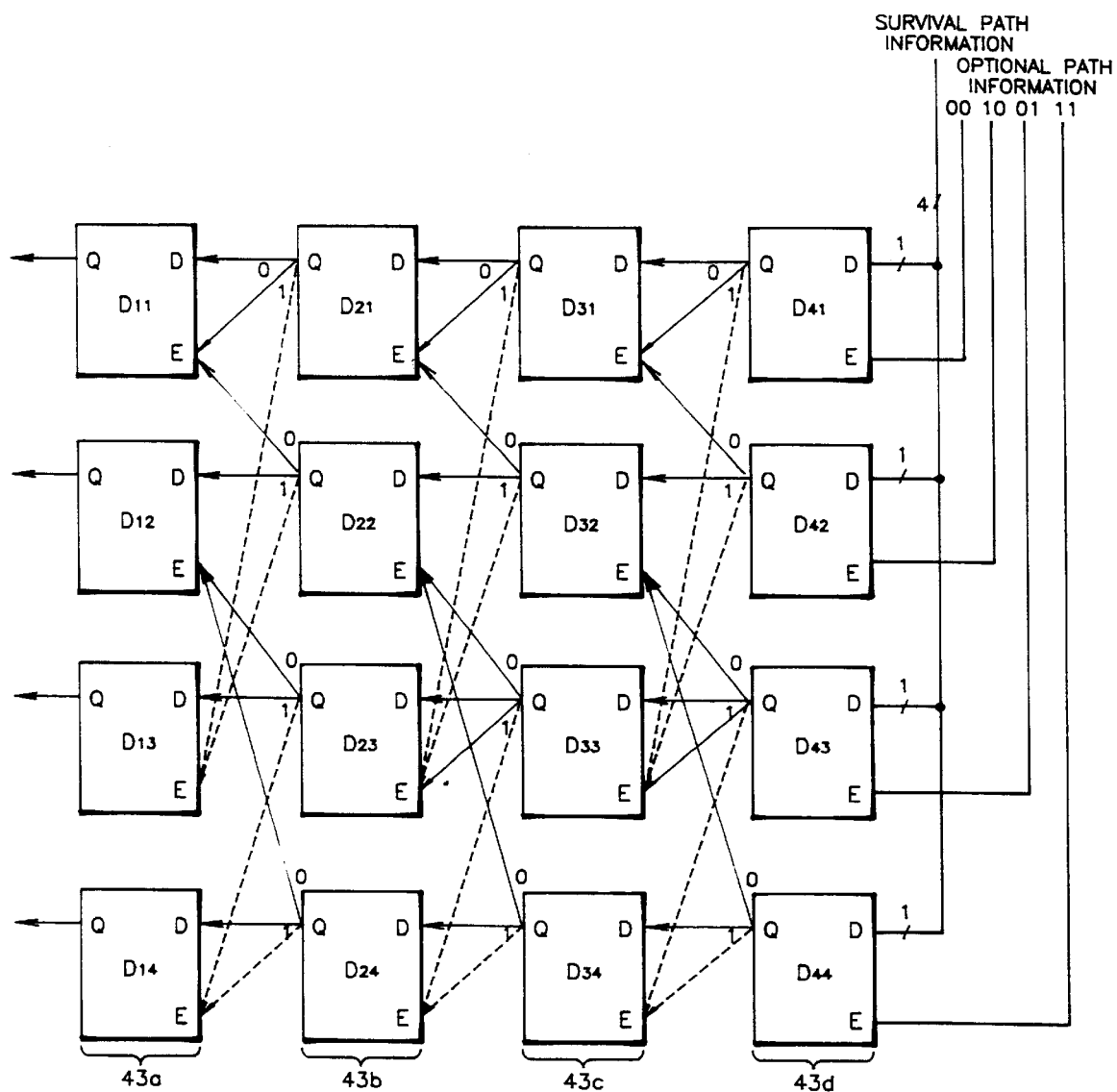
FIG. 13 is a detailed circuit diagram of the path transition history calculator shown in FIG. 6 according to another embodiment of the present invention.

As shown in FIG. 13, the path transition history calculator 40 according to another embodiment of the present invention includes a plurality of memory blocks 43a, 43b, 43c and 43d each enabled by the optimal survival path information output from the optimal path calculator 30, for storing the information on the survival paths of the respective states corresponding to the respective observation sections and outputting the result of the final path transition history.

Here, the number of the plurality of memory blocks 43a, 43b, 43c and 43d are determined by the set observation sections and there are composed of the memory block 43a for storing the information on the survival path of an observation section 1 among the observation sections, the memory block 43b for storing the information on the survival path of an observation section 2, the memory block 43c for storing the information on the survival path of an observation section 3, and the memory block 43d for storing the information on the survival path of an observation section 4.

The respective memory blocks 43a, 43b, 43c and 43d include a plurality of latches D11 to D44 corresponding to the respective states.

The latches D41 to D44 constituting the memory block 43d for storing the information the survival paths for the respective states of the observation section 4, the last section among the observation sections, are input ports D's, to which the information on the survival path for the respective states output from the optimal path calculator 30 is applied, respectively, and are enabled in accordance with the information on the optimal path output from the optimal path calculator 30. The latches D11 to D31 for storing the information on the survival path of 00 state of the observation sections 1, 2 and 3 are enabled by the output signal Q of the latches D21 to D44 for storing the information on the survival path of 00 state of the next observation section or the output signal Q of the latches D22 to D42 for storing the information on the survival path of 10 state of the next observation section. The latches D12 to D32 for storing the information on the survival path of 10 state of the observation sections 1, 2 and 3 are enabled by the output signal Q of the latches D23 to D43 for storing the information on the survival path of 01 state of the next observation section or the output signal Q of the latches D24 to D44 for storing the information on the survival path of 11 state of the next observation section. The latches D13 to D33 for storing the information on the survival path of 01 state of the observation sections 1, 2 and 3 are enabled by the output signal Q of the latches D21 to D41 for storing the information on the survival path of 00 state of the next observation section or the output signal Q of the latches D22 to D42 for storing the information on the survival path of 10 state of the next observation section. The latches D14 to D34 for storing the information on the survival path of 11 state of the observation sections 1, 2 and 3 are enabled by the output signal Q of the latches D23 to D43 for storing the information on the survival path of 01 state of the next observation section or the output signal Q of the latches D24 to D44 for storing the information on the survival path of 11 state of the next observation section.

Another embodiment of the path transition history calculator 40 having the aforementioned configuration will now be described with reference to FIGS. 14 and 15.

Figure 14:
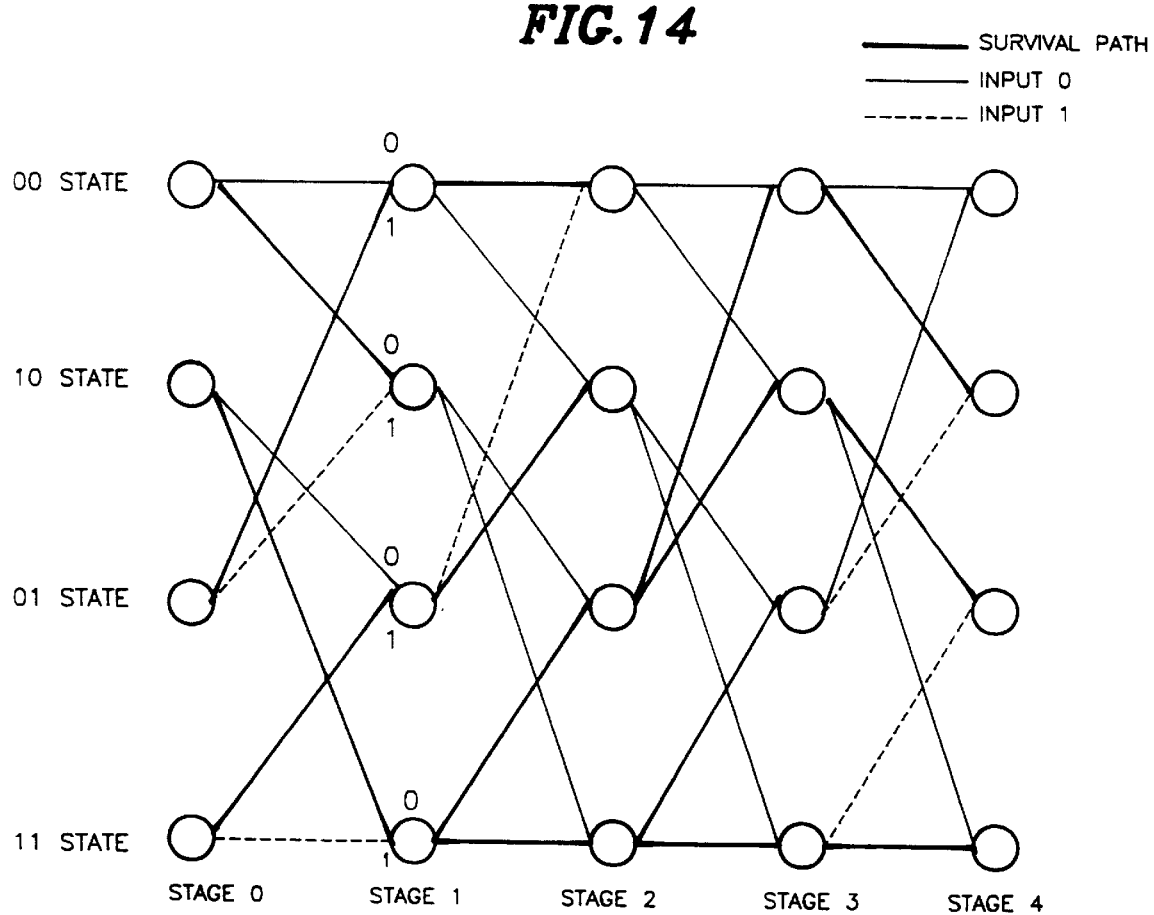
FIG. 14 shows the survival path values stored in the path transition history calculator shown in FIG. 6.

Since the Viterbi decoder for a HDTV according to the present invention restores the signal encoded by the Trellis encoder, the Trellis diagram shown in FIG. 14 is the same as that shown in FIG. 5.

Figure 15:
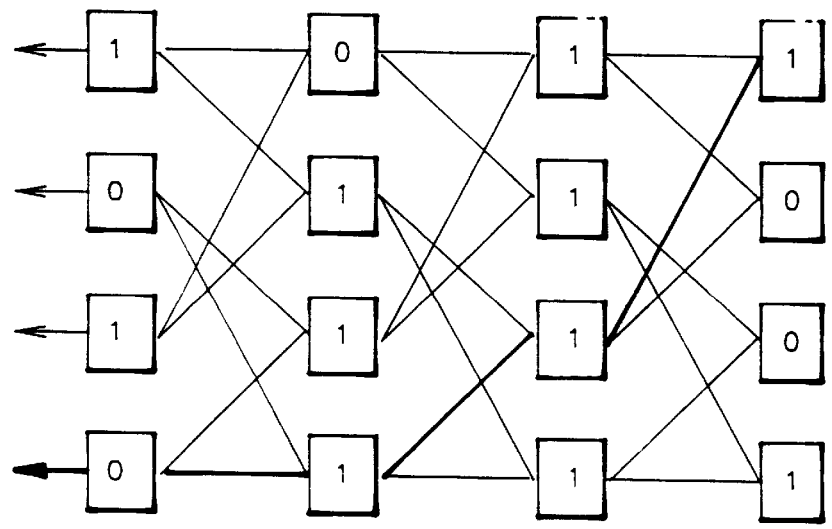
FIG. 15 is a diagram for explaining the operation of FIG. 13.

As shown in FIGS. 14 and 15, in the observation section 1 among the observation sections, the path of the input 1 is selected as a survival path of 00 state, the path of the input 0 is selected as a survival path of 10 state, the path of the input 1 is selected as a survival path of 01 state, and the path of the input 0 is selected as a survival path of 11 state. The path values of the thus selected survival paths of the respective states are stored in the latches D41 to D44 shown in FIG. 13.

In the observation section 2, as shown in FIGS. 14 and 15, if the survival path values of 00 , 10 , 01 and 11 states are selected as 0 , 1 , 1 and 1, respectively, these values are applied to the latches D41 to D44 shown in FIG. 13 again and the data stored in the latches D41 to D44 are moved to the latches 31 to D34.

By repeating such operations, the survival path values of the respective states output from the optimal path calculator 30 are sequentially latched and are stored in the respective latches D11 to D44.

Therefore, if the survival paths are selected in all observation sections, the path transition history calculator 40 reversely traces the survival path value of the first observation section among the observation sections, i.e., the observation section 1, and obtains the output of the overall Trellis diagram, using the look-up table.

That is to say, if the Euclidean distances of the survival paths for the respective states are applied from the Euclidean distance calculator 20, the optimal path calculator 30 compares the applied distance values and selects the path having the smallest value as an optimal path.

Here, as shown in FIG. 15, if the path of 00 state is the optimal path, the optimal path calculator 30 outputs "00" which is the state of the optimal path to the path transition history calculator 40. In the path transition history calculator 40, only the latch D42 is enabled by the output value of "00" and the signal "1" stored therein is output. Therefore, in the observation section 4, the 00 state becomes the optimal path.

The latch D33 connected in a dotted line is enabled by the output signal "1" of the latch D41 and the signal "1" stored therein is output. In the observation section 3, the 01 state becomes the optimal path.

The latch D24 connected in a dotted line is enabled by the output signal "1" of the latch D33 and the signal "1" stored therein is output. In the observation section 2, 01 state becomes the optimal path.

The latch D14 connected in a dotted line is enabled by the output signal "1" of the latch D24 and the signal "0" stored therein is output. In the observation section 1, the 11 state becomes the optimal path.

The path transition history calculator 40 applies the 11 state, optimal path of the first observation section and the value thereof "0" to the look-up table.

The look-up table inputs "0" from 11 state and outputs the input signal of the Trellis encoder of the transmission portion therefrom.

As shown in FIG. 14, in view of the previous observation section 0 and observation section 1, of the two paths 10 and 11 states intersecting in the 11 state, the 10 state which is met upward should be the one in order that "0" value is selected.

This means that there is generated a transition from the 10 state to the 11 state. Thus, it is understood that the value of the Trellis encoder for generating the transition from the 10 state to the 11 state is "1".

Therefore, the look-up table outputs the value "1". The input value can be traced reversely using data shift and latch enabling method.

In order to restore an encoded signal, 12 decoders are used conventionally. However, according to the present invention as described above, simplified memory system and a single decoder are used, thereby allowing a simple hardware implementation. Also, since the memory configuration thereof is regular, when it is intended to extend the observation sections, the memory structure can be extended easily.

Moreover, the present invention can be adopted by extending easily to 3-bit 8 state or above as well as to 2-bit 4-state by means of a general Viterbi decoding algorithm.

What is claimed is:

1. A Viterbi decoder for a high definition television (HDTV) comprising:

metric calculating means for obtaining a difference value between a signal input to the Viterbi decoder and a branch value and adding the obtained value with to an accumulated previous metric value;

optimal path calculating means for outputting information on a survival path for a stage and an optimal survival path within an observation section using the metric value output from said metric calculating means; and path transition history calculating means for determining the value to be output within an observation section by setting in- and out-pointers from the path information output from said optimal path calculating means.

2. The Viterbi decoder for a HDTV as claimed in claim 1 wherein said metric calculating means comprises:

an Euclidean distance calculator for calculating the difference between input signal and branch value;

an accumulator for accumulating metric values; and a plurality of memories for adding the output of said Euclidean distance calculator with the previous metric value and storing the added value therein and outputting the same to said accumulator and said optimal path calculator.

3. The Viterbi decoder for a HDTV as claimed in claim 1 wherein said optimal path calculating means comprises:

a plurality of path selectors for comparing two input metric values output from said metric calculator and selecting the path having a smaller metric value as a survival path; and an optimal survival path selector for comparing the outputs of said path selectors and selecting the path having the smallest metric value.

4. The Viterbi decoder for a HDTV as claimed in claim 1 wherein said path transition history calculating means is composed of 12 memory blocks which perform the same function altogether, connected in parallel, according to multiplexing function.

5. The Viterbi decoder for a HDTV as claimed in claim 1 wherein said path transition history calculating means comprises:

a pointer controller for setting in- and out-pointers in accordance with information on the optimal survival path output from said optimal path calculator; and a plurality of memory blocks for calculating the path transition history in accordance with the information on the survival path enabled by the in-pointer output from said pointer controller and output from said optimal path calculator and outputting the result of the final path transition history in accordance with the out-pointer.

6. The Viterbi decoder for a HDTV as claimed in claim 5 wherein the number of said plurality of memory blocks is determined by set observation sections.

7. The Viterbi decoder for a HDTV as claimed in claim 5 wherein said plurality of memory blocks is composed of:
   a first memory block for storing the information on the survival path of an observation section 1 among the information on the survival path output from said optimal path calculator;
   a second memory block for storing the information on the survival path of an observation section 2;
   a third memory block for storing the information on the survival path of an observation section 3; and
   a fourth memory block for storing the information on the survival path of an observation section 4.

8. The Viterbi decoder for a HDTV as claimed in claim 5 wherein said plurality of memory blocks include a plurality of latches corresponding to the respective states.

9. The Viterbi decoder for a HDTV as claimed in claim 8 wherein the information on the survival path of the respective observation sections output from said optimal path calculator is applied to each input port D of the latches constituting said memory blocks, respectively, the latches for storing the information on the survival path of 00 state of each observation section are enabled by the output signal Q of the latches for storing the information on the survival path of 00 state of the next observation section or the output signal Q of the latches for storing the information on the survival path of 10 state of the next observation section, the latches for storing the information on the survival path of 10 state of each observation section are enabled by the output signal Q of the latches for storing the information on the survival path of 01 state of the next observation section or the output signal Q of the latches for storing the information on the survival path of 11 state of the next observation section, the latches for storing the information on the survival path of 01 state of each observation section are enabled by the output signal Q of the latches for storing the information on the survival path of 00 state of the next observation section or the output signal Q of the latches for storing the information on the survival path of 10 state of the next observation section, and the latches for storing the information on the survival path of 11 state of each observation section are enabled by the output signal Q of the latches for storing the information on the survival path of 01 state of the next observation section or the output signal Q of the latches for storing the information on the survival path of 11 state of the next observation section.

10. The Viterbi decoder for a HDTV as claimed in claim 5 wherein said in-pointer represents a signal to load to the corresponding memory block and a point indicating the position of the memory block corresponding to the state where the optimal path input from said optimal path calculator begins.

11. The Viterbi decoder for a HDTV as claimed in claim 5 wherein said out-pointer is a point indicating the position of the memory block outputting the tracing result of the final path transition history.

12. A Viterbi decoder for a high definition television (HDTV) comprising:
   metric calculating means for obtaining a difference value between a signal input to the Viterbi decoder and a branch value and adding the obtained value to an accumulated previous metric value;
   optimal path calculating means for outputting information on a survival path for a stage and an optimal survival path within an observation section using the metric value output from said metric calculating means; and
   path transition history calculating means including a plurality of memory blocks, each enabled by the optimal survival path information output from said optimal path calculating means, for storing the information on the survival paths of respective states corresponding to respective observation sections and outputting the result of the final path transition history.

13. The Viterbi decoder for a HDTV as claimed in claim 12 wherein each of said plurality of memory blocks corresponds to the observation sections.

14. The Viterbi decoder for a HDTV as claimed in claim 12 wherein said plurality of memory blocks is composed of:
   a first memory block for storing the information on the survival path of an observation section 1;
   a second memory block for storing the information on the survival path of an observation section 2;
   a third memory block for storing the information on the survival path of an observation section 3; and
   a fourth memory block for storing the information on the survival path of an observation section 4.

15. The Viterbi decoder for a HDTV as claimed in claim 12 wherein said plurality of memory blocks includes a plurality of latches corresponding to the respective states.

16. The Viterbi decoder for a HDTV as claimed in claim 15 wherein the latches constituting said fourth memory block for storing the information on the survival paths of the respective states of the observation section 4, are input ports to which the information on the survival path of the respective states output from said optimal path calculating means is applied, and are enabled in accordance with the information on the optimal path output from said optimal path calculating means,
   the latches for storing the information on the survival path of OO state of the observation sections 1, 2 and 3 are enabled by the output signal Q of the latches for storing the information on the survival path of OO state of the next observation section or the output signal Q of the latches for storing the information on the survival path of 10 state of the next observation section,
   the latches for storing the information on the survival path of 10 state of the observation sections 1, 2 and 3 are enabled by the output signal Q of the latches for storing the information on the survival path of 01 state of the next observation section or the output signal Q of the latches for storing the information on the survival path of 11 state of the next observation section,
   the latches for storing the information of the survival path of 01 state of the observation sections 1, 2 and 3 are enabled by the output signal Q of the latches for storing the information on the survival path of 00 state of the next observation section or the output signal Q of the latches for storing the information on the survival path of 10 state of the next observation section,
   the latches for storing the information of the survival path of 11 state of the observation sections 1, 2 and 3 are enabled by the output signal Q of the latches for storing the information on the survival path of 01 state of the next observation section or the output signal Q of the latches for storing the information on the survival path of 11 state of the next observation section.

* * * * *